United States Patent
Shim et al.

(10) Patent No.: US 12,179,757 B2
(45) Date of Patent: Dec. 31, 2024

(54) METHOD FOR FILTERING THE DRIVING ROUTE BASED ON DISTRIBUTED KALMAN FILTER FOR STABILIZATION OF ROUTE TRACKING OF AUTONOMOUS VEHICLES

(71) Applicant: Korea Electronics Technology Institute, Seongnam-si (KR)

(72) Inventors: Young Bo Shim, Seongnam-si (KR); Kyoung Won Min, Seongnam-si (KR); Haeng Seon Son, Seongnam-si (KR); Seon Young Lee, Seoul (KR); Chang Gue Park, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 327 days.

(21) Appl. No.: 17/623,117

(22) PCT Filed: Nov. 30, 2020

(86) PCT No.: PCT/KR2020/017296
§ 371 (c)(1),
(2) Date: Dec. 27, 2021

(87) PCT Pub. No.: WO2022/114329
PCT Pub. Date: Jun. 2, 2022

(65) Prior Publication Data
US 2023/0311867 A1    Oct. 5, 2023

(30) Foreign Application Priority Data
Nov. 25, 2020  (KR) .................. 10-2020-0159594

(51) Int. Cl.
*B60W 30/10* (2006.01)
*B60W 60/00* (2020.01)
(Continued)

(52) U.S. Cl.
CPC .......... *B60W 30/10* (2013.01); *B60W 60/001* (2020.02); *G06V 10/30* (2022.01); *G06V 20/588* (2022.01)

(58) Field of Classification Search
CPC .... B60W 30/10; B60W 60/001; G06V 10/30; G06V 20/588; G05D 1/0212; G06T 7/277
See application file for complete search history.

(56) References Cited

U.S. PATENT DOCUMENTS

2019/0346274 A1* 11/2019 Venkatraman ..... G01C 21/3446
2020/0334571 A1* 10/2020 Bai .......................... G06T 7/20
2021/0364305 A1* 11/2021 Rizk ................. G01C 21/3461

FOREIGN PATENT DOCUMENTS

CN   111409632 A   *  7/2020  ............ B60W 30/12
KR   10-1454153 B1    11/2014
(Continued)

OTHER PUBLICATIONS

Machine Translation of KR-20180040787-A (Year: 2018).*
(Continued)

*Primary Examiner* — Sahar Motazedi
(74) *Attorney, Agent, or Firm* — NSIP Law (57) ABSTRACT

Provided is a method for filtering driving paths in order to stably track a path which is generated for various purposes, such as recognizing a lane and keeping or changing the lane, or avoiding an obstacle around a road. A driving path filtering system according to an embodiment of the present disclosure includes: a position recognition unit configured to recognize a position of a vehicle; a lane recognition unit configured to recognize a lane of a road; and a path generator configured to generate a path for the vehicle to travel on, based on a result of recognizing the position and a result of recognizing the lane, and to perform path noise filtering with respect to the generated path. Accordingly, a driving path can be stabilized by removing a path noise (error) by (Continued)

complementally filtering a lane recognition-based path generation method and a map-based path generation method according to a driving environment.

12 Claims, 5 Drawing Sheets

(51) Int. Cl.
   *G06V 10/30* (2022.01)
   *G06V 20/56* (2022.01)
   *G06V 20/58* (2022.01)

(56) References Cited

FOREIGN PATENT DOCUMENTS

| KR | 10-1658089 | B1 | | 9/2016 |
|---|---|---|---|---|
| KR | 20180040787 | A | * | 4/2018 |
| KR | 20200018183 | A | * | 2/2020 |

OTHER PUBLICATIONS

Machine Translation of CN-111409632-A (Year: 2020).*
Machine Translation of KR-20200018183-A (Year: 2020).*
"Simon. D, 'Kalman Filtering', Jun. 2001, 72-79" (Year: 2001).*
"Ilyas, M., 'Dependable Navigation in GPS Denied Environment'" (Year: 2013).*
"Rigatos, G., 'Derivative-free Distributed Nonlinear Kalman Filtering'" (Year: 2012).*
"Kazerooni, M., 'Federated Ensemble Kalman Filter'" (Year: 2013).*
"Lawrence, P., 'Comparison of Federated and Centralized Kalman Filters'" (Year: 1994).*
Korean Office Action issued on May 7, 2021 in counterpart Korean Patent Application No. 10-2020-0159594 (2 pages in English, 6 pages in Korean).

* cited by examiner

METHOD FOR FILTERING THE DRIVING ROUTE BASED ON DISTRIBUTED KALMAN FILTER FOR STABILIZATION OF ROUTE TRACKING OF AUTONOMOUS VEHICLES

CROSS REFERENCE TO RELATED APPLICATIONS

This application is a U.S. National Stage Application of International Application No. PCT/KR2020/017296 filed on Nov. 30, 2020, which claims the benefit under 35 USC 119 (a) and 365 (b) of Korean Patent Application No. 10-2020-0159594 filed on Nov. 25, 2020, in the Korean Intellectual Property Office, the entire disclosure of which is incorporated herein by reference for all purposes.

TECHNICAL FIELD

The present disclosure relates to a method for generating a path for an autonomous vehicle and filtering therefor, and more particularly, to a method for filtering driving paths in order to stably track a path which is generated for various purposes, such as recognizing a lane and keeping or changing the lane, or avoiding an obstacle around a road.

BACKGROUND ART

A related-art method for generating a path based on lane recognition is a method for generating a path in order to prevent lane departure and to allow a vehicle to follow a center of a lane, and is applied only to highways or motorcar roads, not to a city center having intersections or roads of various shapes.

In the lane recognition-based path generation method, a deviation from a center of a lane on which a vehicle will travel is determined according to a performance index which indicates how exactly lane recognition is performed.

That is, the lane recognition-based path generation method has a disadvantage that it is difficult to use in an environment where a lane is indistinct or there is no lane like an intersection in a city center.

In addition, a related-art map-based path generation method is a method for generating a path to a destination based on a position of a vehicle and a map, but this method is applied only when a position of a vehicle on the map is exactly known to track a path based on the map.

In such a map-based path generation method, an error in a driving path is determined according to how small a position recognition error is, and a position of a vehicle should be exactly known. Therefore, there may be a problem that a path error meaning a deviation from a center of a lane where a real vehicle will travel increases according to a position recognition error.

Accordingly, there is a demand for a method for stabilizing a driving path by filtering driving paths by combining a lane recognition-based path generation method and a map-based path generation method according to a driving environment.

DISCLOSURE

Technical Problem

The present disclosure has been developed in order to address the above-discussed deficiencies of the prior art, and an object of the present disclosure is to provide a driving path filtering method based on a distributed Kalman filter, which can stabilize a driving path by removing a path noise (error) by complementarily filtering a lane recognition-based path generation method and a map-based path generation method according to a driving environment.

Technical Solution

According to an embodiment of the present disclosure to achieve the above-described object, a driving path filtering system includes: a position recognition unit configured to recognize a position of a vehicle; a lane recognition unit configured to recognize a lane of a road; and a path generator configured to generate a path for the vehicle to travel on, based on a result of recognizing the position and a result of recognizing the lane, and to perform path noise filtering with respect to the generated path.

In addition, the path generator of the driving path filtering system may include: a map-based multi-purpose path generation module configured to receive the result of recognizing the position of the vehicle, and to generate a map-based path; a lane-based path generation module configured to receive the result of recognizing the lane, and to generate a lane-based path; a path selection module configured to select any one path from the map-based path and the lane-based path according to a predetermined selection condition; and a path noise removal filtering module configured to perform the path the noise filtering with respect to the selected path.

In addition, the path selection module may exclude the map-based path from the path selection when a position recognition error of the map-based path is greater than or equal to a predetermined error threshold value, and may exclude the lane-based path from the path selection even if a lane is recognized when performance of the lane-based path is less than or equal to a predetermined performance threshold value.

In addition, the path noise removal filtering module may include: a first local filter configured to filter the map-based path; a second local filter configured to filter the lane-based path; and a master filter configured to use a result of filtering through the first local filter or the second local filter as a measurement value input for correcting, and to finally remove a noise.

In addition, a state vector of a path may be defined by Equation 1 presented below when a state k is formed of points that are spaced apart from one another by a predetermined distance l so as to define a set of points as one path $$x_k = \{p_0, p_1, \ldots, p_n\}, \|p_i - p_j\|_2 = l \qquad \text{Equation 1}$$

The first local filter may use the map-based path as a measurement value and may determine a covariance Rmap of the measurement value as a position recognition error, and the second filter may use the lane-based path as a measurement value and may determine a covariance Rlane of the measurement value as lane recognition performance.

In addition, the master filter may use, as a measurement value input for correcting, an estimation value and the covariance $\hat{x}1$, $P_1$ of the map-based path received from the first local filter, and an estimation value and the covariance $\hat{x}2$, $P_2$ of the lane-based path received from the second local filter.

According to another embodiment of the present disclosure, a driving path filtering method includes the steps of: recognizing, by a driving path filtering system, a position of a vehicle or a lane of a road; generating, by the driving path filtering system, a path for the vehicle to travel on, based on a result of recognizing; and performing, by the driving path filtering system, path noise filtering with respect to the generated path.

Advantageous Effects

According to embodiments of the present disclosure as described above, a driving path can be stabilized by removing a path noise (error) by complementally filtering a lane recognition-based path generation method and a map-based path generation method according to a driving environment.

BEST MODE

Hereinafter, the present disclosure will be described in more detail with reference to the drawings.

Figure 1:
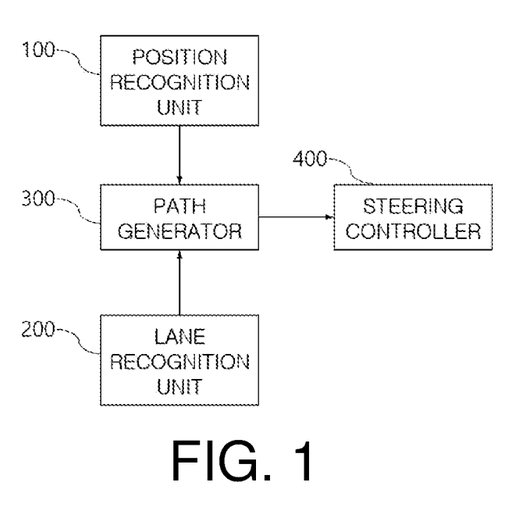
FIG. 1 is a view provided to explain a driving path filtering system according to an embodiment of the present disclosure.

FIG. 1 is a view provided to explain a driving path filtering system according to an embodiment of the present disclosure.

The driving path filtering system according to the present embodiment may stabilize a driving path by removing a path noise (error) by complementally filtering a lane recognition-based path generation method and a map-based path generation method according to a driving environment.

To achieve this, the driving path filtering system may include a position recognition unit 100, a lane recognition unit 200, a path generator 300, and a steering controller 400.

The position recognition unit 100 is provided to recognize a position of a vehicle.

Specifically, the position recognition unit 100 may recognize a position by using a global positioning system (GPS) sensor and an inertial measurement unit (IMU) sensor, and in addition, may calculate a position of a vehicle through a precise map-based position correction system, point cloud data-based localization, etc. In addition, the position recognition unit 100 may provide a position recognition error to the path generator 300.

The lane recognition unit 200 is provided to recognize a lane of a road.

Specifically, the lane recognition unit 200 may use a monocular camera or a stereo camera, and may recognize both a left lane and a right lane, and may numerically provide lane recognition performance to the path generator 300.

Herein, the lane should be expressed by a second-order equation at least or a third-order equation at most in order to express a road including a steep curve, etc. like a city center.

The path generator 300 is provided to generate a path for the vehicle to travel on, based on the result of recognizing the position and the result of recognizing the lane.

In addition, the path generator 300 may perform path noise filtering with respect to the generated path.

Specifically, the path generator 300 may receive base data for generating the path through position recognition and lane recognition, and may generate a multi-purpose path, such as a path for driving on a center of a lane, changing a lane, or going through an intersection, a path for making a U-turn, a path for avoiding an obstacle, based on a precise map or a similar map based on the position of the vehicle.

In addition, the path generator 300 may generate a path for keeping the center of the lane through the lane recognized by the lane recognition unit 200, and may determine that it is difficult to obtain a center lane when a gap between lanes does not satisfy normal regulation of roads or there is a big difference in coefficients between both lanes.

The steering controller 400 may control the vehicle, based on data received from the path generator 300.

Figure 2:
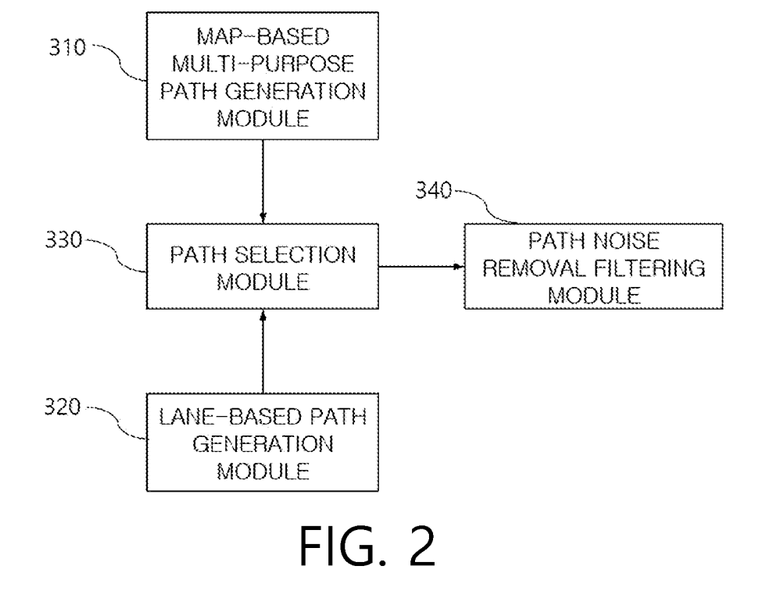
FIG. 2 is a view provided to explain a path generator shown in FIG. 1.

FIG. 2 is a view provided to explain the path generator 300 shown in FIG. 1.

Referring to FIG. 2, the path generator 300 according to the present embodiment may include a map-based multi-purpose path generation module 310, a lane-based path generation module 320, a path selection module 330, and a path noise removal filtering module 340 in order to generate a path for the vehicle to travel on, based on a result of recognizing a position and a result of recognizing a lane, and to perform path noise filtering with respect to the generated path.

The map-based multi-purpose path generation module 310 is provided to receive a result of recognizing a position of the vehicle and to generate a map-based path.

Specifically, the map-based multi-purpose path generation module 310 may generate a multi-purpose path, such as a path for driving on a center of a lane, changing a lane, or going through an intersection, a path for making a U-turn, a path for avoiding an obstacle, based on a precise map or a similar map based on the position of the vehicle.

The lane-based path generation module 320 is provided to receive a result of recognizing a lane and to generate a lane-based path.

Specifically, the lane-based path generation module 320 may generate a path for keeping the center of the lane through the lane received from the lane recognition unit 200, and may determine that it is difficult to obtain a center lane when a gap between lanes does not satisfy normal regulation of roads or there is a big difference in coefficients between both lanes.

The path selection module 330 is provided to select any one of the map-based path and the lane-based path according to a predetermined selection condition.

That is, the path selection module 330 may determine whether the generated paths are qualified as driving paths. Specifically, when a position recognition error of the map-based path is greater than or equal to a predetermined error threshold value, the path selection module 330 may exclude the map-based path from the path selection, and, when performance of the lane-based path is less than or equal to a predetermined performance threshold value, the path selection module 330 may exclude the lane-based path from the path selection even if the lane is recognized. Herein, the predetermined error threshold value may be defined by Tmap, and the predetermined performance threshold value may be defined by Tlane.

The path noise removal filtering module 340 is provided to perform path noise filtering with respect to the selected path.

Figure 3:
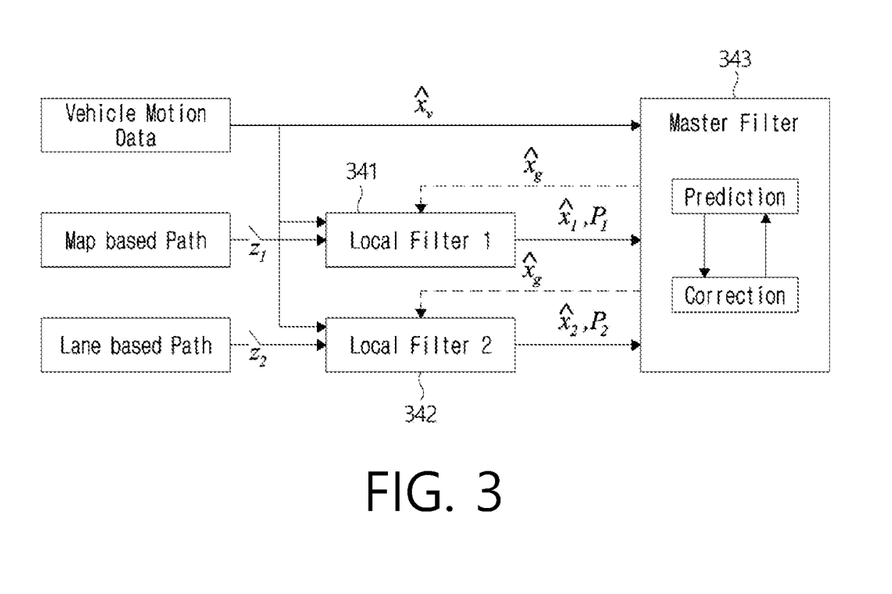
FIG. 3 is a view provided to explain a path noise removal filtering module shown in FIG. 2.

FIG. 3 is a view provided to explain the path noise removal filtering module 340 shown in FIG. 2.

Referring to FIG. 3, the path noise removal filtering module 340 according to the preset embodiment may include a first local filter 341, a second local filter 342, and a master filter 343 in order to perform path noise filtering with respect to the selected path.

The first local filter 341 is provided to filter the map-based path, and the second local filter 342 is provided to filter the lane-based path.

Specifically, the first local filter 341 may use the map-based path as a measurement value, and may determine a covariance Rmap of the measurement value as a position recognition error, and the second local filter 342 may use the lane-based path as a measurement value, and may determine a covariance Rlane of the measurement value as lane recognition performance.

Herein, the respective paths may be filtered by the first local filter 341 or the second local filter 342, and a state vector of the path may be defined by using Equation 1 presented below:

$$x_k = \{p_0, p_1, \ldots, p_n\}, \|p_i - p_j\|_2 = l \quad \text{Equation 1}$$

Herein, the state k is formed of points that are spaced apart from one another by a predetermined distance l, and xx indicates motion information of the vehicle, and a set of points is defined as one path.

The master filter 343 is provided to use the result of filtering through the first local filter 341 or the second local filter 42 as a measurement input for correcting, and finally to remove a noise.

The master filter 343 may use an estimation value and the covariance $\hat{x}_1$, $P_1$ of the map-based path received from the first local filter 341, and an estimation value and the covariance $\hat{x}_2$, $P_2$ of the lane-based path received from the second local filter 342, as a measurement input for correcting, and may predict a driving path based on the motion information of the vehicle. The result of removing the noise by the master filter 343 may be provided to the steering controller 400, and simultaneously, may be inputted back to the first local filter 341 and the second local filter 342, so that the noise is continuously removed.

Herein, Vehicle Motion Data refers to motion information of the vehicle, Map based Path is the map-based path, and Lane based Path is the lane-based path.

$x_v$ is a path for providing the motion information of the vehicle, $z_1$ is a path for providing the map-based path, and $z_2$ is a path for providing the lane-based path.

$z_1$ and $z_2$ may be enabled or disabled to determine whether to provide data, respectively, and, when a specific path is selected through the path selection module 330, any one may be enabled according to the selected path and may provide data of the selected path.

Figure 4:
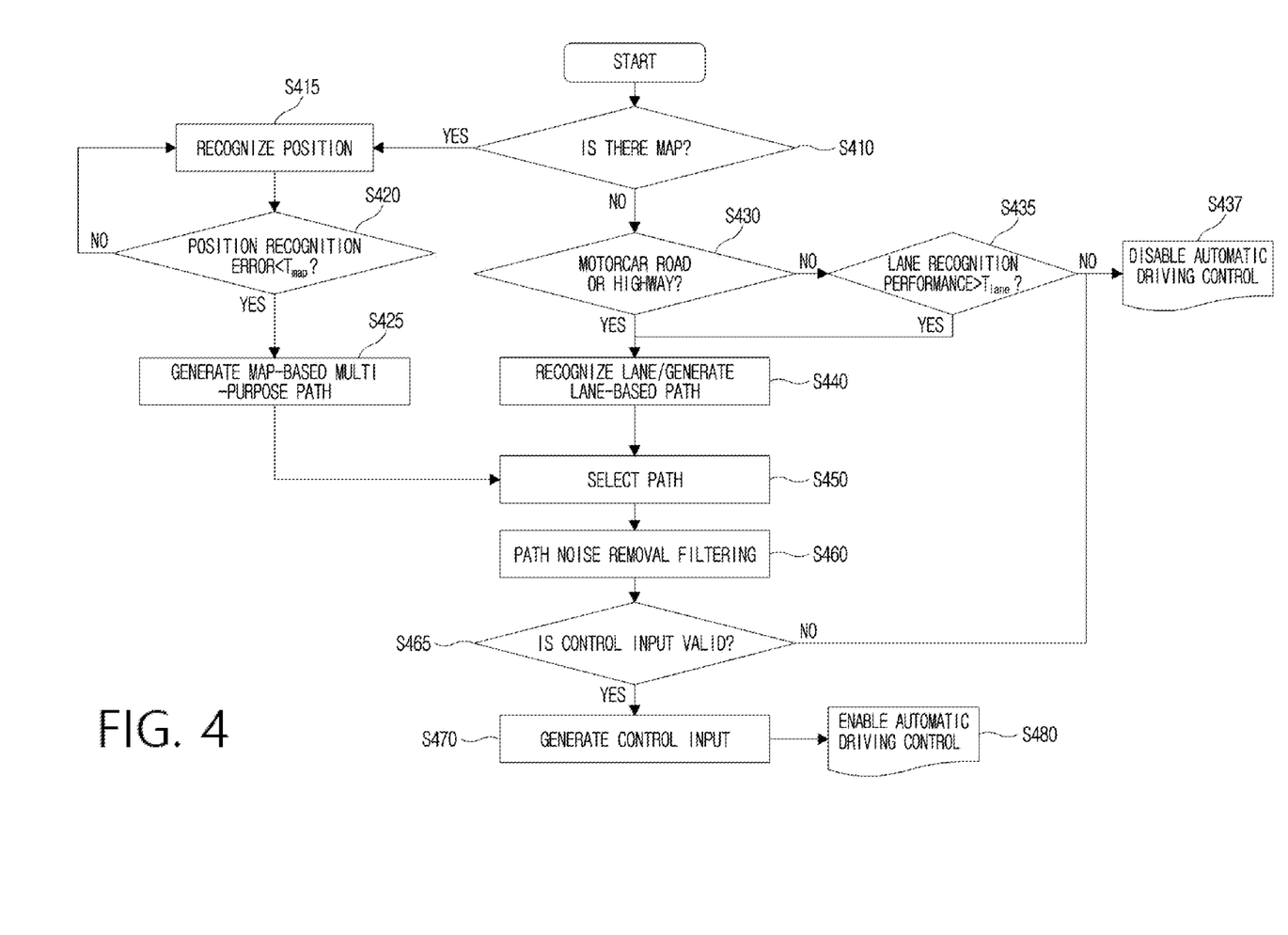
FIG. 4 is a view provided to explain a driving path filtering method using the driving path filtering system according an embodiment of the present disclosure.
Figure 5:
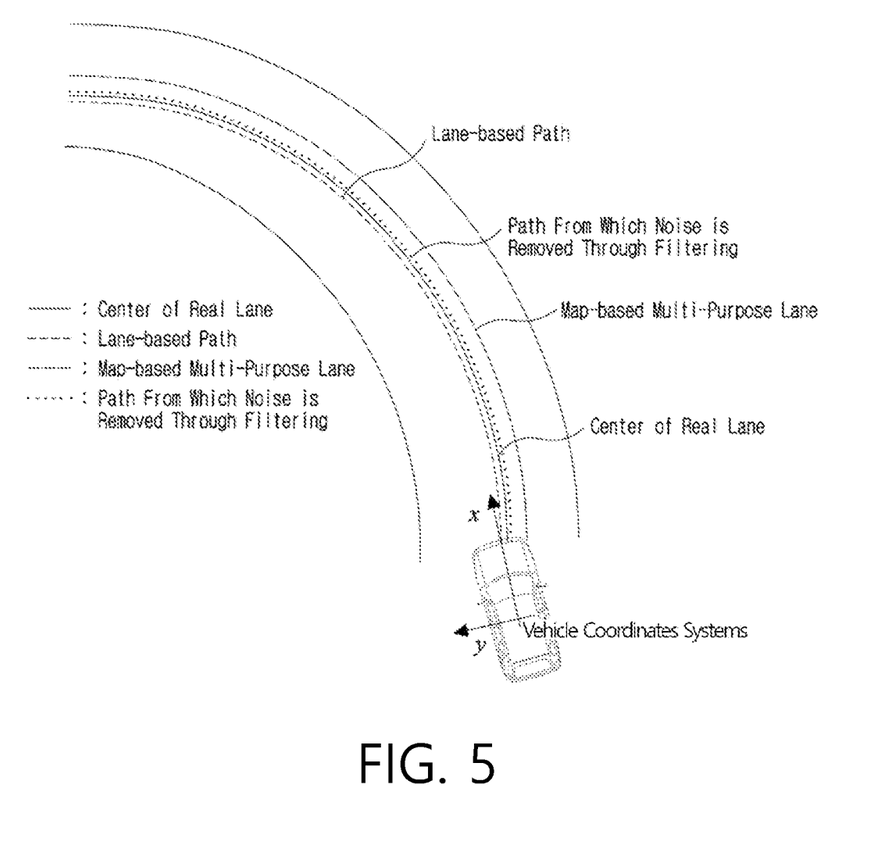
FIG. 5 is a view illustrating a path which is filtered by the driving path filtering method according to an embodiment of the present disclosure.

FIG. 4 is a view provided to explain a driving path filtering method using the driving path filtering system according to an embodiment, and FIG. 5 is a view illustrating a path which is filtered through the driving path filtering method according to an embodiment of the present disclosure.

Referring to FIG. 4, the driving path filtering method according to the present embodiment may recognize a position of a vehicle or a lane of a road by using the driving path filtering system, may generate a path for the vehicle to travel on, based on the result of recognizing, may select one path from the generated paths, and may perform path noise filtering.

Specifically, the driving path filtering method may generate a map-based (multi-purpose) path (S425) by using the driving path filtering system when map data is acquired (in S410, if Yes), a position of the vehicle is recognized (S415), and a position recognition error is less than a predetermined error threshold value (S420).

In addition, the driving path filtering method may recognize a lane when map data is not acquired (in S410, if NO), and may determine whether the road is a motorcar road or a highway (S430), and, when the road is neither the motorcar road nor the highway (in S430, if NO) and lane recognition performance exceeds a predetermined performance threshold value (in S435, in Yes), may generate a lane-based path based on the result of recognizing the lane (S440).

In this case, in a state where map data is not acquired (in S410, if NO) and the map-based path is not generated, when the lane recognition performance is less than or equal to the predetermined performance threshold value (in S435, if NO), it may be difficult to generate a path and it may be impossible to control automatic driving (S437).

When the map-based path and the lane-based path are generated, in S450 one of the generated paths may be selected as a driving path in the method described above with reference to FIGS. 1 to 3, and a path noise of the selected driving path may be filtered (S460).

In S465, the driving path filtering method may determine whether a control input is valid. When valid (in S465, if Yes), the driving path filtering method may generate a control input and it may enable automatic driving control (S480). When not valid (in S465, if NO), it may disable automatic driving control (S437).

FIG. 5 is a view illustrating a result of path noise removal filtering. Herein, the map-based path and the lane-based path may have different errors, respectively, as shown in FIG. 5.

In addition, when a noise is removed by the path noise removal filtering module 340 and a path for an autonomous vehicle to travel on most stably is finally generated by using the result of removing the noise, the path may be provided to the steering controller 400 and a control input may be generated, and through the control input, steering of the vehicle may be controlled, so that automatic driving can be controlled.

Through this, a driving path may be stabilized by removing a path noise (error) by complementarily filtering the lane recognition-based path generation method and the map-based path generation method according to a driving environment.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer (e.g., processor(s)) and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A driving path filtering system comprising:
one or more processors comprising:
a position recognition unit configured to recognize a position of a vehicle;
a lane recognition unit configured to recognize a lane of a road; and
a path generator configured to generate a map-based path for the vehicle to travel on, based on a result of recognizing the position of the vehicle, to generate a lane-based path based on a result of recognizing the lane, and to perform path noise filtering with respect to the generated map-based path or the generated lane-based path using a path noise removal filtering module
wherein the one or more processors are configured to control a steering of the vehicle based on the generated map-based path or the generated lane-based path onto which the path noise filtering is performed,
wherein the path noise removal filtering module comprises:
a first local filter configured to filter the map-based path;
a second local filter configured to filter the lane-based path; and
a master filter configured to receive, as an input, a result of filtering through the first local filter or the second local filter, to correct an error associated with the map-based path or the lane-based path by removing a noise corresponding to the error associated with the map-based path or the lane-based path, and to feed a result of the removing the noise back to each of the first local filter and the second local filter.

2. The driving path filtering system of claim 1, wherein the path generator comprises:
a map-based multi-purpose path generation module configured to receive the result of recognizing the position of the vehicle, and to generate the map-based path;
a lane-based path generation module configured to receive the result of recognizing the lane, and to generate the lane-based path;
a path selection module configured to select any one path from the map-based path and the lane-based path according to a predetermined selection condition; and
the path noise removal filtering module configured to perform the path noise filtering with respect to the selected path.

3. The driving path filtering system of claim 2, wherein the path selection module is configured to, when a position recognition error of the map-based path is greater than or equal to a predetermined error threshold value, exclude the map-based path from the path selection, and, when performance of the lane-based path is less than or equal to a predetermined performance threshold value, exclude the lane-based path from the path selection even if the lane is recognized.

4. The driving path filtering system of claim 2, wherein a state vector xx of either the map-based path or the lane-based path is defined by Equation 1 presented below when a state k is formed of points that are spaced apart from one another by a predetermined distance l so as to define a set of points as one path:

$$x_k = \{p_0, p_1, \ldots, p_n\}, \|p_i - p_j\|_2 = l \qquad \text{Equation 1}$$

5. The driving path filtering system of claim 4, wherein the first local filter is configured to receive, as an input, the map-based path and to determine a covariance of the map-based path as a position recognition error, and
wherein the second filter is configured to receive, as an input, the lane-based path and to determine a covariance of the lane-based path as lane recognition performance.

6. The driving path filtering system of claim 5, wherein the master filter is configured to receive an estimation value $\hat{x}_1$, and the covariance $P_1$ of the map-based path from the first local filter, and receive an estimation value $\hat{x}_2$, and the covariance $P_2$ of the lane-based path from the second local filter.

7. A processor-implemented driving path filtering method comprising:
recognizing, by a driving path filtering system, a position of a vehicle;
recognizing, by the driving path filtering system, a lane of a road;
generating, by the driving path filtering system, a map-based path for the vehicle to travel on, based on a result of recognizing the position of the vehicle;
generating, by the driving path filtering system, a lane-based path based on a result of recognizing the lane of the road;
performing, by the driving path filtering system, path noise filtering with respect to the generated map-based path or the generated lane-based path using a path noise removal filtering module; and
controlling, by the driving path filtering system, a steering of the vehicle based on the generated map-based path or the generated lane-based path onto which the path noise filtering is performed,
wherein the performing the path noise filtering comprises:
filtering, using a first local filter, the map-based path;
filtering, using a second local filter, the lane-based path;
receiving, using a master filter, as an input, a result of filtering through the first local filter or the second local filter;
correcting an error associated with the map-based path or the lane-based path by removing a noise corresponding to the error associated with the map-based path or the lane-based path; and
providing a result of the removing the noise back to each of the first local filter and the second local filter.

8. The method of claim 7, further comprising:
receiving the result of recognizing the position of the vehicle for generating the map-based path;
receiving the result of recognizing the lane for generating the lane-based path;
selecting any one path from the map-based path and the lane-based path according to a predetermined selection condition; and
performing the path noise filtering with respect to the selected path.

9. The method of claim 8, wherein the selecting comprises: when a position recognition error of the map-based path is greater than or equal to a predetermined error threshold value, excluding the map-based path from the path selection, and when performance of the lane-based path is less than or equal to a predetermined performance threshold value, excluding the lane-based path from the path selection even if the lane is recognized.

10. The method of claim 8, wherein a state vector $x_k$ of either the map-based path or the lane-based path is defined by Equation 1 presented below when a state k is formed of points that are spaced apart from one another by a predetermined distance l so as to define a set of points as one path:

$$x_k = \{p_0, p_1, \ldots, p_n\}, \|p_i - p_j\|_2 = l \qquad \text{Equation 1}$$

11. The method of claim 10, wherein the first local filter is configured to receive, as an input, the map-based path and to determine a covariance of the map-based path as a position recognition error, and wherein the second filter is configured to receive, as an input, the lane-based path and to determine a covariance of the lane-based path as lane recognition performance.

12. The method of claim 11, wherein the master filter is configured to receive an estimation value $\hat{x}_1$, and the covariance $P_1$ of the map-based path from the first local filter, and receive an estimation value $\hat{x}_2$, and the covariance $P_2$ of the lane-based path from the second local filter.

\* \* \* \* \*